(12) United States Patent
Miki et al.

(10) Patent No.: US 8,690,493 B2
(45) Date of Patent: Apr. 8, 2014

(54) END MILL

(75) Inventors: Takashi Miki, Akashi (JP); Yuji Takagi, Akashi (JP)

(73) Assignee: Mitsubishiki Materials Corporation, Tokyo (JP)

( * ) Notice: Subject to any disclaimer, the term of this patent is extended or adjusted under 35 U.S.C. 154(b) by 816 days.

(21) Appl. No.: 12/672,921

(22) PCT Filed: Aug. 12, 2008

(86) PCT No.: PCT/JP2008/064438
§ 371 (c)(1),
(2), (4) Date: Feb. 10, 2010

(87) PCT Pub. No.: WO2009/025197
PCT Pub. Date: Feb. 26, 2009

(65) Prior Publication Data
US 2012/0148352 A1     Jun. 14, 2012

(30) Foreign Application Priority Data

Aug. 21, 2007  (JP) ................................ 2007-214698

(51) Int. Cl.
*B23C 5/10*    (2006.01)
(52) U.S. Cl.
USPC ............................................. 407/54; 407/61
(58) Field of Classification Search
USPC ........ 408/223, 219, 233, 144, 230; 47/53, 30, 47/54, 63, 119, 115–6; 407/54, 60, 62–3; 76/108.6
See application file for complete search history.

(56) References Cited

U.S. PATENT DOCUMENTS

| 2,328,629 | A | * | 9/1943 | Eich et al. ..................... 408/230 |
| 2,887,136 | A | * | 5/1959 | Rathgeber ..................... 144/219 |
| 3,003,224 | A |   | 10/1961 | Ribich |
| 3,078,546 | A | * | 2/1963 | Kiernan .......................... 407/30 |
| 4,212,568 | A | * | 7/1980 | Minicozzi ....................... 407/53 |
| 4,381,162 | A | * | 4/1983 | Hosoi ........................... 408/1 R |
| 5,049,009 | A |   | 9/1991 | Beck et al. |
| 5,209,612 | A | * | 5/1993 | Kish .............................. 407/54 |
| 5,230,593 | A | * | 7/1993 | Imanaga et al. .............. 408/230 |
| 5,350,261 | A | * | 9/1994 | Takaya et al. ................. 408/229 |

(Continued)

FOREIGN PATENT DOCUMENTS

| JP | 04-40122 B | 3/1985 |
| JP | 60-048211 A | 3/1985 |

(Continued)

OTHER PUBLICATIONS

Japanese Office Action dated Apr. 18, 2012 for the corresponding Japanese Application No. 2007-24698.

(Continued)

*Primary Examiner* — Boyer D Ashley
*Assistant Examiner* — Fernando Ayala
(74) *Attorney, Agent, or Firm* — Leason Ellis LLP.

(57) ABSTRACT

An end mill including multiple spiral flutes in a helical shape around an axis that are formed in a periphery of the top portion of an end mill body which rotates on the axis. Cutting edges are formed at peripheral side ridge portions of wall surfaces of the flutes facing a front side in an end mill rotating direction. Honing is applied along each peripheral cutting edge such that the cutting edge has a variable honing width in the direction of the axis.

12 Claims, 4 Drawing Sheets

(56) References Cited

U.S. PATENT DOCUMENTS

| | | | |
|---|---|---|---|
| 5,609,447 A * | 3/1997 | Britzke et al. | 408/230 |
| 5,829,927 A * | 11/1998 | Nakamura et al. | 408/230 |
| 6,056,485 A * | 5/2000 | Magill et al. | 407/54 |
| 6,105,467 A * | 8/2000 | Baker | 76/104.1 |
| 6,585,460 B1 * | 7/2003 | Meece et al. | 408/230 |
| 6,669,412 B1 * | 12/2003 | Hirose et al. | 407/113 |
| 6,939,090 B1 | 9/2005 | Nagaya et al. | |
| 7,001,113 B2 * | 2/2006 | Flynn et al. | 407/54 |
| 7,544,021 B2 * | 6/2009 | Flynn | 407/59 |
| 7,588,396 B2 * | 9/2009 | Flynn | 407/54 |
| 7,618,219 B2 * | 11/2009 | Osawa et al. | 407/53 |
| 7,950,880 B2 * | 5/2011 | Henderer et al. | 408/222 |
| 2003/0180104 A1 * | 9/2003 | Kuroda et al. | 407/54 |
| 2005/0147475 A1 | 7/2005 | Nagaya et al. | |
| 2006/0039767 A1 * | 2/2006 | Yamamoto et al. | 408/230 |
| 2006/0067797 A1 * | 3/2006 | Calamia | 407/53 |
| 2007/0248422 A1 * | 10/2007 | Song | 407/54 |
| 2008/0245227 A1 * | 10/2008 | Iizumi et al. | 92/169.1 |
| 2009/0232610 A1 * | 9/2009 | Takagi et al. | 407/54 |
| 2011/0008113 A1 * | 1/2011 | Abe | 407/42 |

FOREIGN PATENT DOCUMENTS

| | | | | |
|---|---|---|---|---|
| JP | 06-031519 A | | 2/1994 | |
| JP | 06-315816 A | | 11/1994 | |
| JP | 07-241715 A | | 9/1995 | |
| JP | A-07-241715 | | 9/1995 | |
| JP | 409029530 A | * | 2/1997 | B23C 5/10 |
| JP | H09-207007 A | | 8/1997 | |
| JP | 2000-052128 A | | 2/2000 | |
| JP | P02002028884 A | * | 1/2002 | |
| JP | 2002-052415 A | | 2/2002 | |
| JP | A-2002-052415 | | 2/2002 | |
| JP | 2005178326 | * | 7/2005 | |

OTHER PUBLICATIONS

Chinese Office Action issued on Mar. 9, 2011 for the corresponding Chinese Patent Application No. 200880103604.1.

European Search Report mailed Mar. 5, 2013 for the corresponding European Application No. 08827621.7.

* cited by examiner

END MILL

CROSS-REFERENCE TO RELATED APPLICATIONS

This is a U.S. national phase application under 35 U.S.C. §371 of International Patent Application No. PCT/JP2008/064438 filed Aug. 12, 2008, which claims the benefit of Japanese Application No. 2007-214698 filed Aug. 21, 2007, each of which is incorporated by reference herein its entirety. The International Application was published in Japanese on Feb. 26, 2009 as International Publication No. WO/2009/025197 under PCT Article 21(2).

FIELD OF THE INVENTION

The present invention relates to an end mill including multiple flutes formed on a periphery of a top portion, of an end mill body which rotates on an axis, and peripheral cutting edges formed along peripheral side ridge portions of the wall surfaces of the flutes facing toward the end mill rotating direction.

BACKGROUND OF THE INVENTION

Conventionally, for example, an end mill used for die cutting, etc. includes an end mill body made of a hard material, such as cemented carbide, and formed in a cylindrical rod shape. The end mill body includes a shank portion, by which devices, such as the chuck of a machine tool, can hold the end mill body, placed at the rear end side in the direction of the axis; and a cutting edge portion, where cutting edges for cutting a workpiece are provided, placed in closer to the top side than the shank portion in the direction of the axis. In such an end mill, multiple flutes having a helical shape around an axis are formed in the periphery of the cutting edge portion from the top side toward the rear end side. Further, peripheral cutting edges (cutting edges) are formed along intersecting ridgeline portions (outer peripheral side ridge portions) between the wall surfaces of the flutes facing to the front side in an end mill rotating direction and peripheral surface facing radially outward. Additionally, end cutting edges are formed along intersecting ridgeline portions between the wall surfaces of the flutes facing to the front side in the end mill rotating direction and the top face of the end mill body.

To hold the above described end mill in a machine tool, a chuck of the machine tool grips the shank portion placed on the rear end side of the end mill body in a cantilevered state. Further, when rotating the end mill on the axis at high speed, and also then feeding the end mill in a direction intersecting with the axis; peripheral cutting edges of the cutting edge portion cut into a workpiece to machine it.

In order to prolong the tool life of this end mill and also to improve the cutting performance of this end mill, it is important to improve the fracture resistance of the cutting edges. However, if the cutting edges are excessively sharp for cutting a workpiece, cutting force may concentrate in the cutting edges, and then fracture may occur thereon. If the cutting edges with such fracture continue cutting; a problem arises in which the cutting performance becomes remarkably poor. To improve the fracture resistance, for example, Patent Documents 1 and 2 mention end mills in which straight or round shaped honing is made along the cutting edges.

PATENT DOCUMENT 1

Japanese Patent Publication No. H04-40122

PATENT DOCUMENT 2

Japanese Unexamined Patent Application No. 2000-52128

In this case, the tool life of the end mill can be prolonged, and the cutting performance may be improved. However, the honing also makes the sharpness of the cutting edges decrease, and consequently its cutting performance becomes poor. Also, burrs generated in a workpiece cause a poor finished surface. Since an extra process of removing these burrs is required, the possibility arises that machining cost will increase.

SUMMARY OF THE INVENTION

The present invention was made in view of such a problem and the object thereof is to provide an end mill capable of improving the fracture resistance of each cutting edge to prolong its tool life and to prevent burrs from being generated in a workpiece so that good cutting can be performed.

In order to solve the above problem, the invention is directed to an end mill that includes: multiple spiral flutes in a helical shape around an axis, formed in an periphery of the top portion of the end mill body which rotates on the axis; and peripheral cutting edges formed along ridge portions at the peripheral sides of wall surfaces of the flutes facing to the front side in the end mill rotating direction. Honing, namely, an edge preparation, is made along the peripheral cutting edges. Honing width of each cutting edge is variable in the direction of the axis.

In an end mill having the above construction, where the honing width of the cutting edge is large an improved fracture resistance is provided to endure a large cutting resistance; and where the honing width of the cutting edge is small, sharpness of the cutting edge is maintained for excellent cutting performance. Accordingly, the end mill, in which the honing width of the peripheral cutting edge is variable in the direction of the axis according to the cutting conditions, shows good performance. For example, the honing width of the peripheral cutting edge may be increased in the place where fracture tends to occur, and decreased in the other places. Such variable honing width enables the cutting edge to maintain good cutting performance together with a prolonged tool life, and to prevent the generation of burrs.

Additionally, in an end mill according to the invention, the honing width of the peripheral cutting edge may become gradually smaller from the front side in the end mill rotating direction toward the rear side in the end mill rotating direction.

When feeding the end mill in a direction intersecting with the axis in order to cut a workpiece, a part of each peripheral cutting edge, which is at the periphery of the top of the end mill and is located on the front side in the end mill rotating direction, initially touches the workpiece and bites into it. Each peripheral cutting edge is helical, and is provided with a flute. Therefore, this part tends to be fractured due to the biting impact. However, the end mill of the present invention has a construction in which the honing width of each peripheral cutting edge is greatest at the part on the front side in the end mill rotating direction, and becomes gradually smaller toward the rear side in the end mill rotating direction. This construction improves the fracture resistance at the place where fracture is most likely to occur; and while other parts of each cutting edge are able to maintain its cutting performance. Therefore, the tool life of each cutting edge can be prolonged, and also the generation of burrs can be prevented.

Additionally, in an end mill according to the present invention, the honing width of the peripheral cutting edge becomes gradually greater from the front side in the end mill rotating direction toward the rear side in the end mill rotating direction.

For example, a workpiece with a surface harder than its other portions may be machined by using a general helical flute type end mill in which each flute is twisted helically in the end mill rotating direction from the top side toward the rear end side. In such a case, since each of the cutting edges nearer to the rear end side of the end mill cuts the surface of the workpiece; the rear end side of the cutting edge tends to be fractured. The honing of the peripheral cutting edge is made to have a construction in which the honing width becomes gradually greater from the front side in the end mill rotating direction toward the rear side in the end mill rotating direction. In other words, the honing width gradually increases from the front side of the end mill toward the rear end side thereof. Such a construction can improve the fracture resistance at the rear end side, where each peripheral cutting edge cuts the surface of such workpiece, will be the top side of each peripheral cutting edge can maintain its cutting performance. Therefore, even if a workpiece with a hard surface is machined, it is possible to prolong the tool life of the cutting edges.

According to an end mill related to the invention, the honing width of each peripheral cutting edge is variable in the direction of the axis. This construction can improve the fracture resistance of each peripheral cutting edge, and also can prolong the tool life. Further, this construction maintains the cutting performance of the cutting edge, and prevents the generation of burrs in a workpiece. Therefore, a cutting operation can be performed in a good condition.

BRIEF DESCRIPTION OF THE DRAWINGS

Hereinafter, an end mill of an embodiment of the invention will be described in reference to the accompanying drawings.

DETAILED DESCRIPTION OF THE INVENTION

In a preferred embodiment of the present invention, an end mill has an end mill body 1, which is in a cylindrical shape substantially and rotates on an axis O.

Figure 1:
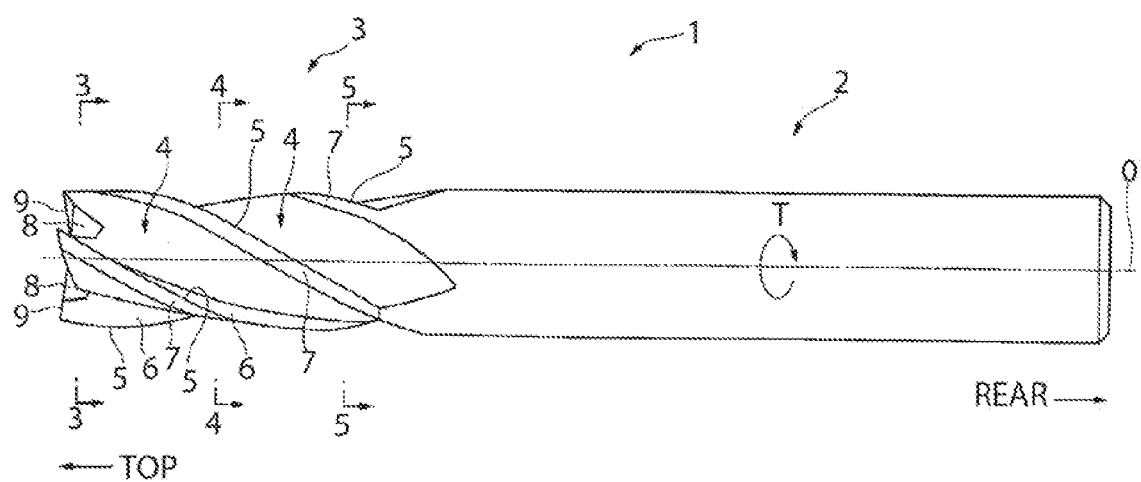
FIG. 1 is a side view of an end mill that is an embodiment of the invention.
Figure 2:
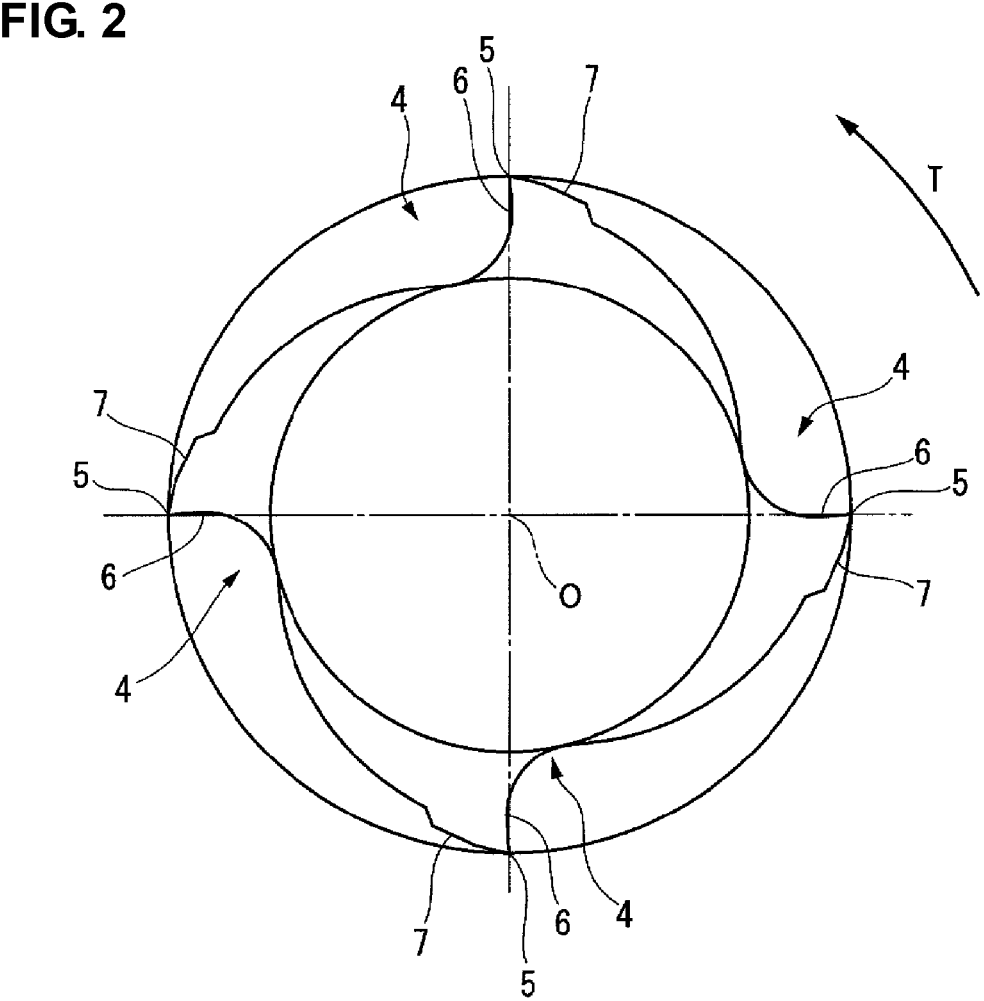
FIG. 2 is a sectional view of a cutting edge portion in FIG. 1.

A rear end (rightmost in FIG. 1) of the end mill body 1 comprisesa shank portion 2 by which a spindle end of a machine tool, etc. can grip the end mill body 1.

A top portion (leftmost in FIG. 1) of the end mill body 1 comprisesa cutting edge potion 3.

In a periphery of the cutting edge portion 3, multiple (four as illustrated in the present embodiment) flutes 4 in a helical shape around the axis O with a constant helix angle, which is an angle rearward in the end mill rotating direction T, are formed from the top side of the end mill body 1 toward the rear end side at intervals of a radial constant. Intersecting ridge portions are formed between twall surfaces of the flutes 4 facing to the front side in the end mill rotating direction T and peripheral surfaces connected continuously with rears of the wall surfaces in the end mill rotating direction T. Peripheral cutting edges 5 are also formed along such intersecting ridge portions, namely, ridge portions at peripheral sides of wall surfaces.

These four peripheral cutting edges 5 in a helical shape around the axis O with a predetermined constant helix angle, which is an angle rearward in the end mill rotating direction T, are formed from the top side of the end mill body 1 toward the rear end side. Then, the wall surface of each flute 4 facing to the front side in the end mill rotating direction T comprises a rake face 6, and also the peripheral surface connected continuously with the rear side of the flute 4 in the end mill rotating direction T comprises a flank face 7 of peripheral each cutting edge 5. Here, the rake face 6 is formed in the shape of a concavely curved face recessed rearward in the end mill rotating direction T, to make a rake angle of the cutting edge 5 positive. In addition, a rotational locus of the peripheral cutting edge 5 rotating on the axis O is a circle around the axis O as its center in a cross-sectional view perpendicular to the axis O in this embodiment.

On the other hand, end gashes 8, which extend toward the inner peripheral side from the flutes 4, are placed in a top portion side of the cutting edge portion 3. End cutting edges 9, which extend radially inward from the tops of the peripheral cutting edges 5 to the vicinity of the axis O of the end mill body 1, are formed along the top side ridge portions of the wall surfaces of the flutes 4 facing to the front side in the end mill rotating direction T.

Along a boundary portion connecting the rake face 6 and the flank face 7 of the peripheral cutting edge 5, the honing, by which the boundary portion shows a circular arc shape in the cross-section perpendicular to the axis O, is made. In this preferred embodiment of the invention, the peripheral cutting edge 5 has a construction in which the honing width is variable in the direction of the axis O. Specifically, in this embodiment, by the honing, the circular arc along the boundary between the rake face 6 and the flank face 7 of the peripheral cutting edge 5 has a radius of curvature which is variable and becomes gradually continuously smaller from the front side of the end mill body 1 in the end mill rotating direction T toward the rear side thereof in the end mill rotating direction T, namely, from the top side of the end mill body 1 toward the rear end side thereof.

Figure 3:
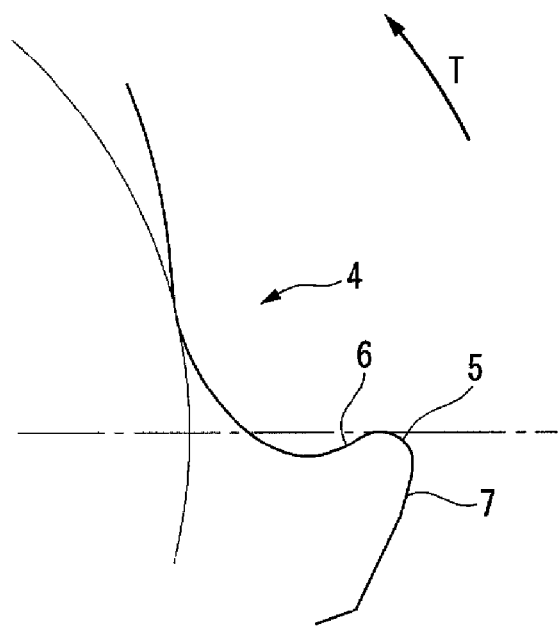
FIG. 3 is a magnified view in the vicinity of a cutting edge of an 3-3 sectional view in FIG. 1.

In detail, FIG. 3 shows the peripheral cutting edge 5 in a cross-section perpendicular to the axis O at the top portion of the cutting edge portion 3. Since the honing made at the top of the peripheral cutting edge 5 has a large width, the circular arc formed at the boundary between the rake face 6 and the flank face 7 has a large radius of curvature.

Figure 4:
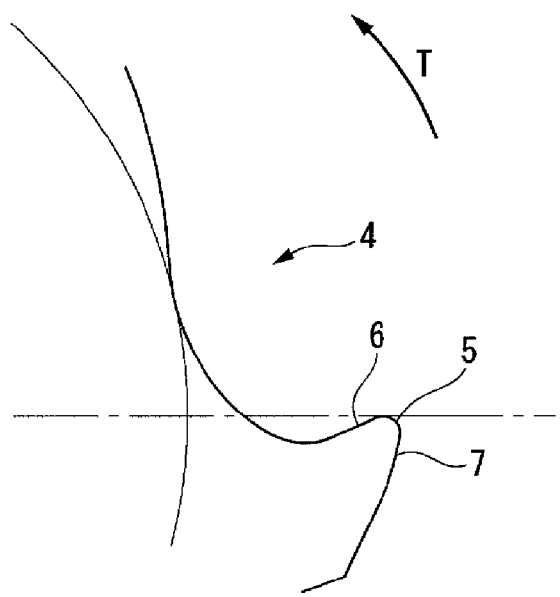
FIG. 4 is a magnified view in the vicinity of a cutting edge of a 4-4 sectional view in FIG. 1.

Further, FIG. 4 shows the peripheral cutting edge 5 in a cross-section at the middle position of the cutting edge portion 3 in the direction of the axis O. Since the honing made at this position has a width smaller than that of the honing at the top portion, the circular arc formed at the boundary between the rake face 6 and the flank face 7 has a radius of curvature smaller than that of the circular arc at the top portion.

Figure 5:
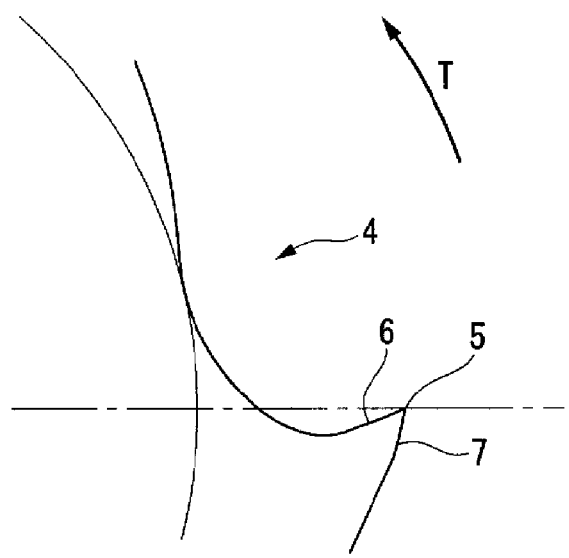
FIG. 5 is a magnified view in the vicinity of a cutting edge of a 5-5 sectional view in FIG. 1.

Further, FIG. 5 shows the cutting edge 5 in the cross-section perpendicular to the axis O at the rear end of the cutting edge portion 3. Since the honing is hardly made at this position, the rake face 6 and the flank face 7 intersect each other forming not a circular arc but an acute angle at the boundary between them. The peripheral cutting edge 5 at the rear end of the cutting edge portion 3 is a sharp one.

In order to hold the end mill 1 having the aforementioned construction in a machine tool, a spindle end of the machine tool grips the shank portion 2 formed at the rear end of the end mill 1. In this state, rotating the end mill 1 on the axis O, and also feeding the end mill 1 in a direction intersecting with the axis O; machining such as slotting a workpiece is performed. Also, chips from the workpiece are removed toward the rear end of the cutting edge portion 3 along the flute 4.

In an end mill having the construction in which the honing width of each peripheral cutting edge 5 is variable in the direction of the axis O, fracture resistance becomes improved in the place where the honing width of each peripheral cutting edge 5 is large, while the sharpness of a cutting edge is still maintained and the cutting performance becomes excellent in the place where the honing width is small. The honing width of each peripheral cutting edge 5 of the end mill 1 is variable according to the performance required of each potion of the cutting edge 5. In other words, the honing width of each peripheral cutting edge is increased in the place where fractures tend to occur, and also the honing width of the cutting edge is decreased in the other place. This variable honing width enables each peripheral cutting edge 5 to maintain good cutting performance together with a prolonged tool life, and also can prevent the generation of burrs in a workpiece.

In the end mill of this embodiment, each peripheral cutting edge 5 is twisted in helical around the axis O rearward in the end mill rotating direction T from the top side toward the rear end side. Thus, when machining a workpiece; a portion of each peripheral cutting edge 5, which is at the top side and is located on the foremost side in the end mill rotating direction T, initially touches the workpiece and bites into it. Therefore, the top side of each peripheral cutting edge 5 tends to be fractured due to this biting impact. However, the end mill of this embodiment has a construction in which the honing width at the top portion of the peripheral cutting edge 5 is large enough for the portion to obtain improved fracture resistance. Therefore, the peripheral cutting edge 5 can become free from fracture and other forms of damage, and the tool life of the cutting edge 5 can be prolonged.

On the other hand, the honing width of the peripheral cutting edge 5 becomes gradually smaller from the front side in the end mill rotating direction T toward the rear side in the end mill rotating direction T, i.e., from the top side of the end mill body 1 toward the rear end side thereof. Thus, the cutting performance of the peripheral cutting edge 5 is excellent in the rear end side.

Therefore, in the peripheral cutting edges 5, the top side portion maintains a high fracture resistance, and also the other portion, namely, the portion nearer to the rear end side than the top of portion, can perform smoothly a cutting operation without the generation of burrs.

As described above, according to the end mill related to this embodiment, the end mill has the construction in which the honing width of the peripheral cutting edge 5 is variable in the direction of the axis. The peripheral cutting edge 5 of the end mill is in helical rearward in the end mill rotating direction T around the axis O from the top side toward the rear end side.

Further, the honing width of the peripheral cutting edge 5 is set so as to become gradually smaller from the front side in the end mill rotating direction T toward the rear side in the end mill rotating direction T. Therefore, this construction enables the peripheral cutting edge 5 to improve its fracture resistance and to prolong its tool life. Further, good cutting performance of the peripheral cutting edge 5 can be maintained, a workpiece becomes free from the generation of burrs, and then the cutting operation can be performed in a good condition.

Although the embodiment of the end mill of the invention has been described in detail, the invention is not limited thereto as long as the embodiment does not depart from the technical idea of the invention. Additionally, some design variations can be made. For example, the end mill of this embodiment has been described as the end mill in which the peripheral cutting edge 5 is twisted helically around the axis O rearward in the end mill rotating direction T from the top side toward the rear end side. In this end mill, the honing width becomes gradually smaller from the front side of the peripheral cutting edge 5 in the end mill rotating direction T toward the rear side thereof in the end mill rotating direction T. However, an end mill, in which the honing width becomes gradually larger from the front side of the cutting edge in the end mill rotating direction T toward the rear side thereof in the end mill rotating direction T, may be available as a first variation.

When a workpiece with a surface harder than its other portions, is machined by using a helical flute type end mill, in which each flute is twisted rearward in the end mill rotating direction from the top side toward the rear end side. In such case, since the rear end side of each peripheral cutting edge of the end mill cuts the surface of the workpiece; this rear end side of the peripheral cutting edge tends to be fractured. However, in the end mill of the first variation, the honing width becomes gradually larger from the front side in the end mill rotating direction T toward the rear end in the end mill rotating direction T, i.e., from the top side toward the rear end side. Thus, this variation enables each peripheral cutting edge at the top side to maintain its cutting performance, and also enables the rear end side, where each peripheral cutting edge cuts the surface of the workpiece, to improve its fracture resistance. Therefore, even if a workpiece with a hard surface is machined, it is possible to prolong the tool life of the cutting edges.

Additionally, as a second variation, an end mill of the invention, in which each cutting edge is twisted helically around the axis O forward in the end mill rotating direction T from the top side toward the rear end side, is usable for forming a slit in a plate shaped workpiece.

In the case of the end mill of this second variation, when machining a workpiece; a portion of the peripheral cutting edge, which is at the rear end side and is located on the foremost side in the end mill rotating direction, initially touches the workpiece and bites into it. Accordingly, a construction, in which the honing width of each peripheral cutting edge increases gradually from the top side toward the rear end side, enables the rear end side of the peripheral cutting edge to have a high fracture resistance and also enables the other portions of the peripheral cutting edge to maintain good cutting performance. Therefore, fractures at the rear end side of the peripheral cutting edge can be prevented; and the cutting operation can be performed smoothly without generating burrs.

Additionally, straight chamfer honing; in which a cross-section perpendicular to the axis intersects a rake face and a flank face, and the honing width is variable in the direction of the axis; is also available as the honing made on each peripheral cutting edge.

Accordingly, the invention is to be limited only by the scope of the claims and their equivalents.

Industrial Applicability

Provided is an end mill, in which the fracture resistance of each cutting edge is improved to prolong the tool life. Further, by using the end mill, the generation of burrs in a workpiece can be prevented and then the cutting operation can be performed in a good condition.

The invention claimed is:

1. An end mill comprising:
multiple spiral flutes in a helical shape around an axis, formed in a periphery of a top portion of the end mill body configured for rotating on the axis; and
peripheral cutting edges formed along ridge portions at peripheral sides of wall surfaces of the flutes, said wall surfaces facing a forward direction in an end mill rotating direction: wherein a honed portion is provided along the peripheral cutting edges; and
a honed amount of each peripheral cutting edge is variable along the direction of the axis, wherein
the honed amount of each peripheral cutting edge of the end mill is consistently gradually smaller from a forward portion in the end mill rotating direction toward a rearward portion in the end mill rotating direction.

2. An end mill comprising:
multiple spiral flutes in a helical shape around an axis, formed in a periphery of a top portion of the end mill body configured for rotating on the axis; and
peripheral cutting edges formed along ridge portions at peripheral sides of wall surfaces of the flutes, said wall surfaces facing a forward direction in an end mill rotating direction: wherein a honed portion is provided along the peripheral cutting edges; and
a honed amount of each peripheral cutting edge is variable along the direction of the axis, wherein
the honed amount of each peripheral cutting edge of the end mill is consistently gradually greater from a forward portion in the end mill rotating direction toward a rearward portion in the end mill rotating direction.

3. The end mill according to claim 1, wherein
the honed amount represents a degree of honing formed on each of the peripheral cutting edges.

4. An end mill comprising:
multiple spiral flutes in a helical shape around an axis, formed in a periphery of a top portion of the end mill body configured for rotating on the axis; and
peripheral cutting edges formed along ridge portions at peripheral sides of wall surfaces of the flutes, said wall surfaces facing a forward direction in an end mill rotating direction: wherein a honed portion is provided along the peripheral cutting edges;

a honed amount of each peripheral cutting edge is variable along the direction of the axis; and a shank portion by which a device can grip the end mill, wherein
the honed amount of each peripheral cutting edge of the end mill is consistently gradually smaller from the top side of the end mill toward an end of the shank portion in the direction of the axis.

5. An end mill comprising:
multiple spiral flutes in a helical shape around an axis, formed in a periphery of a top portion of the end mill body configured for rotating on the axis; and
peripheral cutting edges formed along ridge portions at peripheral sides of wall surfaces of the flutes, said wall surfaces facing a forward direction in an end mill rotating direction: wherein a honed portion is provided along the peripheral cutting edges;
a honed amount of each peripheral cutting edge is variable along the direction of the axis; and a shank portion by which a device can grip the end mill, wherein
the honed amount of each peripheral cutting edge of the end mill is consistently gradually greater from the top side of the end mill toward an end of the shank portion in the direction of the axis.

6. The end mill according to claim 1, wherein
the honed portion is provided in such a manner that a circular arc is formed at the ridge portion.

7. The end mill according to claim 2, wherein
the honed amount represents a degree of honing formed on each of the peripheral cutting edges.

8. The end mill according to claim 4, wherein
the honed amount represents a degree of honing formed on each of the peripheral cutting edges.

9. The end mill according to claim 5, wherein
the honed amount represents a degree of honing formed on each of the peripheral cutting edges.

10. The end mill according to claim 2, wherein
the honed portion is provided in such a manner that a circular arc is formed at the ridge portion.

11. The end mill according to claim 4, wherein
the honed portion is provided in such a manner that a circular arc is formed at the ridge portion.

12. The end mill according to claim 5, wherein
the honed portion is provided in such a manner that a circular arc is formed at the ridge portion.

* * * * *